United States Patent [19]

Hodama

[11] Patent Number: 4,786,791
[45] Date of Patent: Nov. 22, 1988

[54] DATA PROCESSING APPARATUS WITH PORTABLE CARD HAVING MAGNETIC STRIP SIMULATOR

[75] Inventor: Takuo Hodama, Watsonville, Calif.

[73] Assignee: Gateway Technology, San Francisco, Calif.

[21] Appl. No.: 12,944

[22] Filed: Feb. 10, 1987

[51] Int. Cl.⁴ .............................................. G06K 7/08
[52] U.S. Cl. ........................................ 235/449; 235/482
[58] Field of Search ................................. 235/449, 482

[56] References Cited

U.S. PATENT DOCUMENTS 4,146,174  3/1979  Dartany ............................... 235/482
4,701,601  10/1987 Francini ............................... 235/449

Primary Examiner—Harold I. Pitts
Attorney, Agent, or Firm—Fliesler, Dubb, Meyer & Lovejoy

[57] ABSTRACT

A data card using a simulator for magnetic stripes in generating a data signal. The data signal is read by a magnetic coil, having a drive signal provided to the coil by a circuit on the card which simulates the magnetic flux reversals of the magnetic stripes.

16 Claims, 4 Drawing Sheets

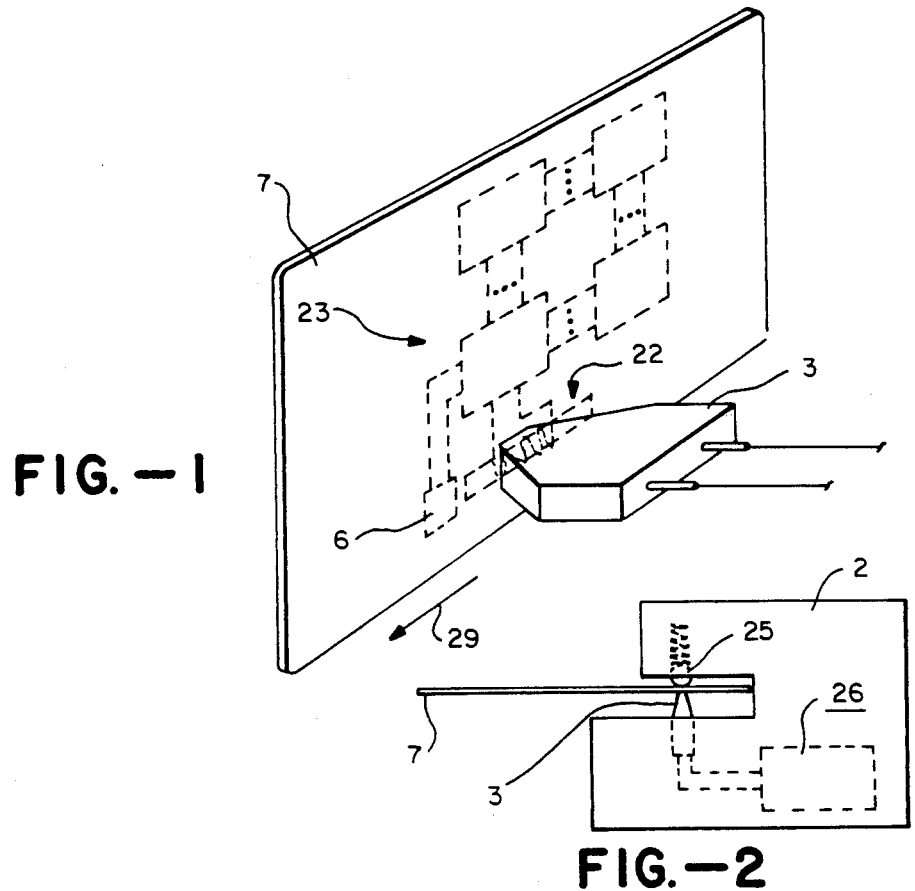
FIG.—1
FIG.—2
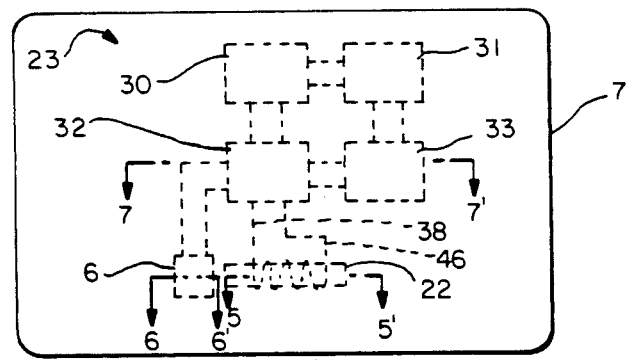
FIG.—3
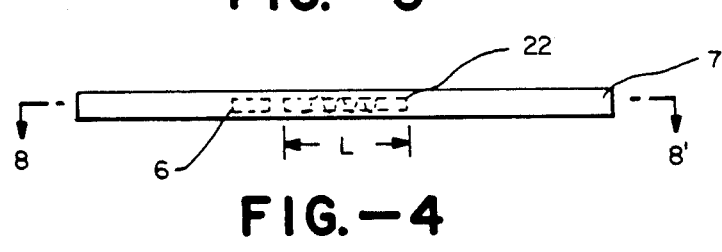
FIG.—4

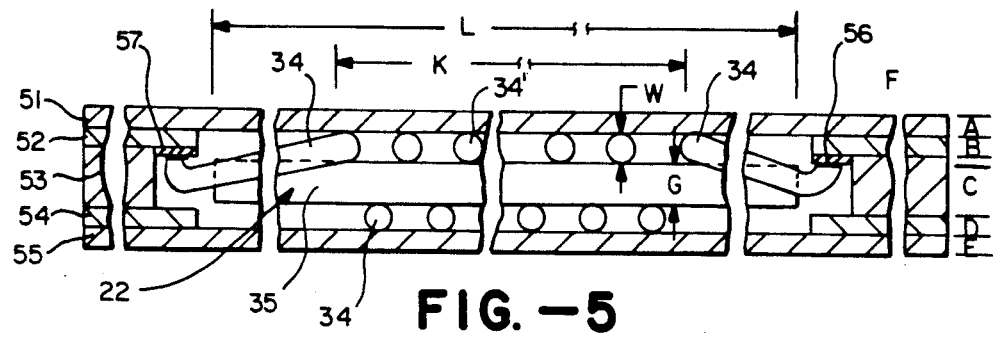
FIG.—5
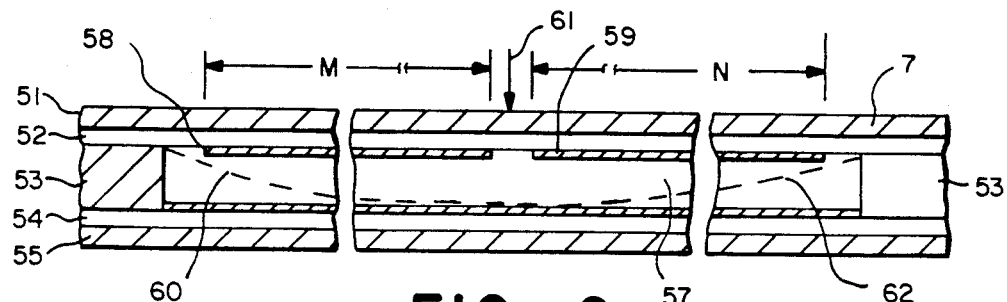
FIG.—6
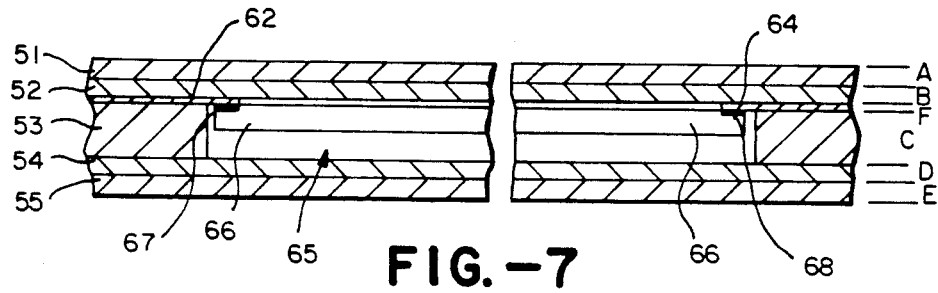
FIG.—7
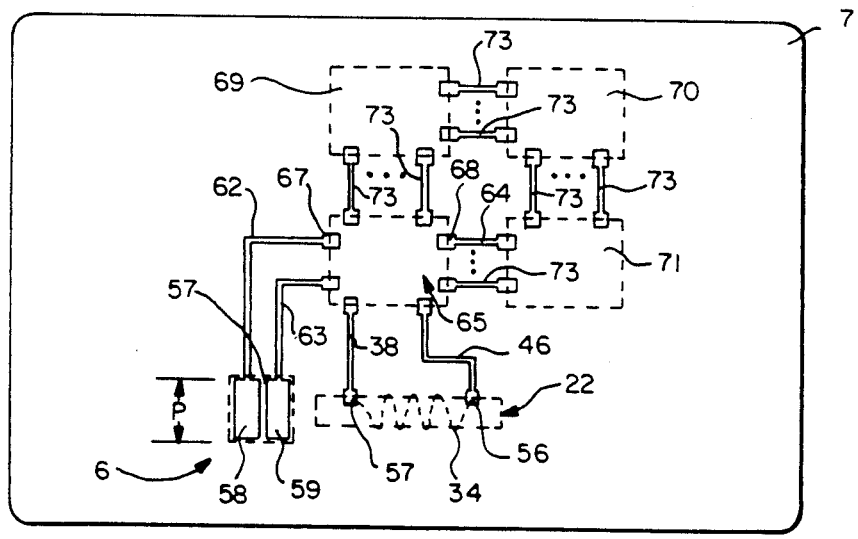
FIG.—8

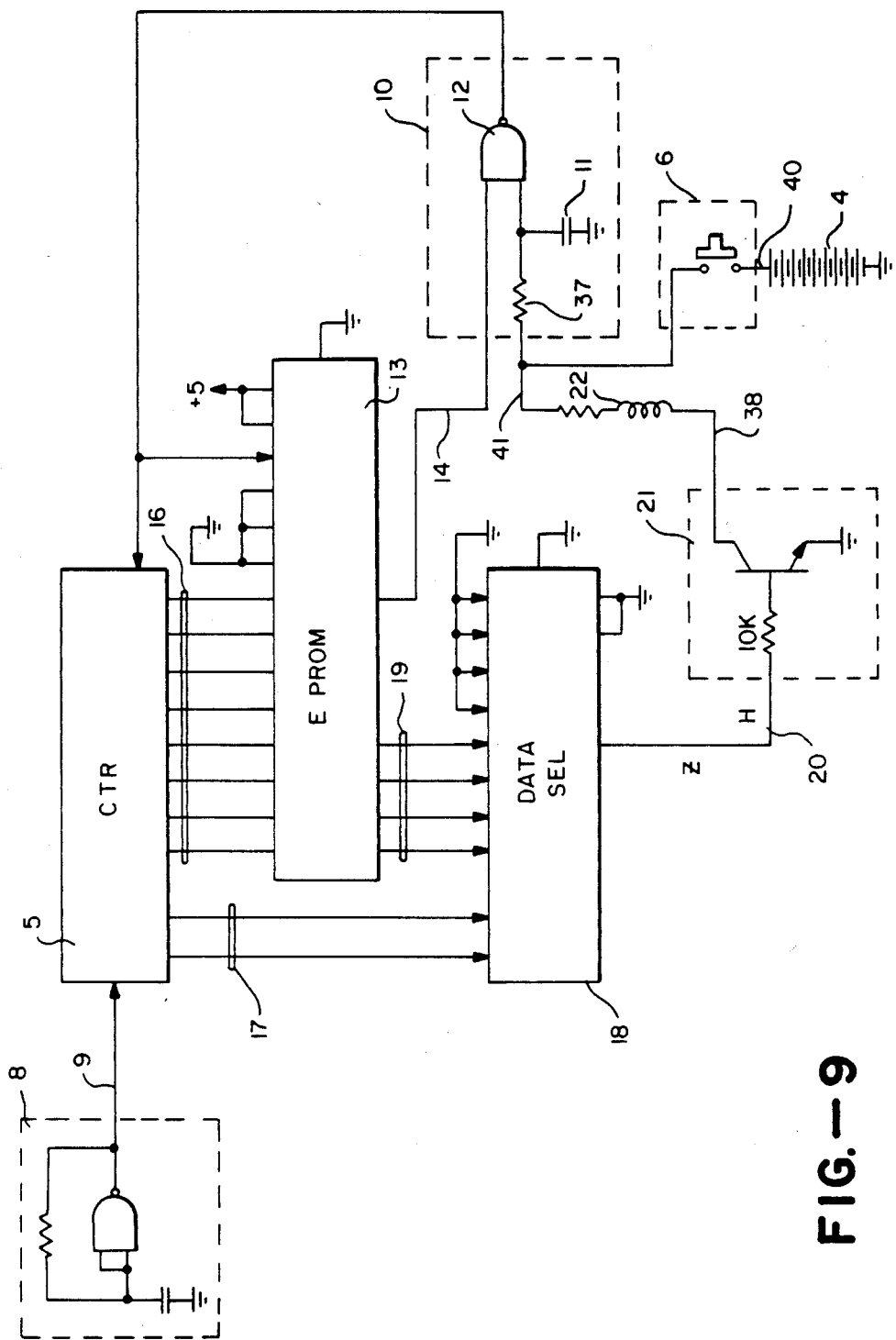
FIG.—9

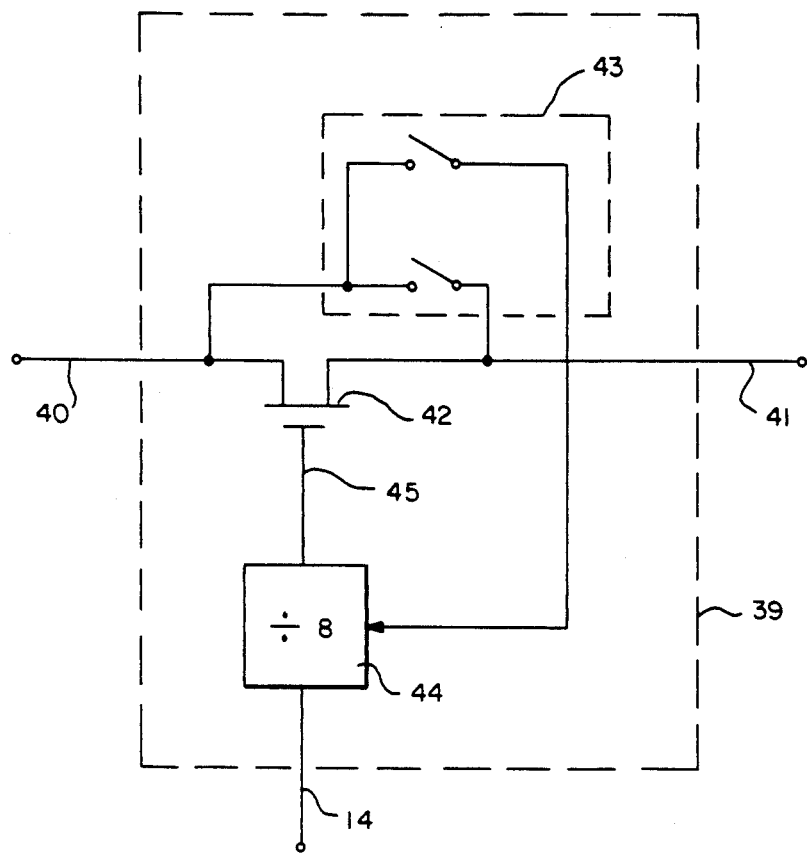
FIG.—10
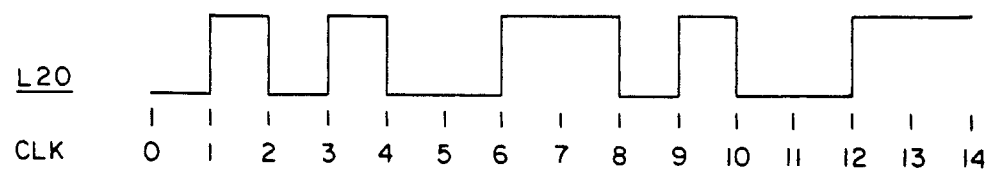
FIG.—11

DATA PROCESSING APPARATUS WITH PORTABLE CARD HAVING MAGNETIC STRIP SIMULATOR

BACKGROUND OF THE INVENTION

The present invention relates to on-line and off-line data processing systems and particularly to host computers and portable card computers.

Portable card computers have been proposed for many years and have sometimes been identified as "Smart Cards". The need for portable card computers arises for many reasons. Card computers will replace credit cards and will help to reduce the annular loss from fraud and misuse of credit cards. In the United States alone, the annular loss presently exceeds 800 million dollars and is expected to increase rapidly.

In addition to replacing existing credit cards, card computers will perform many new functions as they become more widely used. For example, card computers will be used to maintain individual personalized records for many diverse transactions including banking, purchases, medical care, government programs, and business expenses. Additionally card computers will be useful as identification devices for building entry, computer access and many other uses.

Credit cards and other cards in wide use today provide simple one-way data transfers during transactions. Typically, data including an account message is embossed on the credit card and also is stored on a magnetic strip along a surface of the card. When the magnetic strip is moved relative to a read head in a card reader, the account message data stored by the magnetic strip is detected by the card reader. Also, the account message embossed on the credit card is readily transferred to multiple-copy voucher slips in many off-line transactions.

Many differnt types of cards are in use today and much equipment is installed for reading the magnetic strips on the cards. Any new card, in order to be practical, should maintain compatibility with the existing magnetic card equipment.

Recently "smart" cards have been proposed for use in connection with automatic tellers, transaction processors and other data processing equipment. These "smart" cards are plugged into a station for exchanging information between the system and the card and, at times, for processing information on the card.

The cards which have hertofore been used or proposed have suffered from signal transfer problems. These problems are manifested as a limitation on the data rate at which information can be transferred between the system and the card. Furthermore, dirt, dust or contact resistance often causes errors in the transfer of information. When mechanical contacts are employed, errors frequently occur due to dirt or dust or due to the failure of the contacts after repeated insertion and withdrawal of pluggable connections. Accordingly, there is a need to increase the reliability of portable cards of all kinds and particularly "smart cards" which maintain compatibility with magnetic strip technology.

In light of the above background, there is a need for improved storage and processing devices which provide compatible and high-speed data transfer and portability.

SUMMARY OF THE INVENTION

The present invention is a transaction card which includes a magnetic stripe simulator for providing a signal to the read head of a magnetic stripe reader which is comprised of a coil for providing a signal to the read head and circuit for providing a drive signal to the coil. The circuit provides a bit pattern which simulates the magnetic flux reversals provided from magnetic stripes. The apparatus of the circuit includes a digital memory for storing digital data, an address counter for addressing the memory, and an output circuit for connecting the output data from the memory to the coil whereby the magnetic stripe simulation data is read from the memory for driving the coil. The coil includes a high mu metal core and a multiturn winding which is wrapped around the core wherein the core and the winding are less than 0.030 inch and embedded in the card.

The foregoing and other objects, features and advantages of the invention will be apparent from the following detailed description in conjunction with the drawings.

BRIEF DESCRIPTION OF THE DRAWINGS

FIG. 1 depicts an isometric view of a card juxtaposed a read head for reading data from the card.

FIG. 2 depicts a schematic view of a card inserted into a card reader.

FIG. 3 depicts a top view of a card having a coil of the present invention.

FIG. 4 depicts an end view of a card.

FIG. 5 depicts a sectional view of the card of FIG. 3 taken along the section lines 5—5'.

FIG. 6 depicts a sectional view of the card 7 of FIG. 3 taken along the section line 6—6'.

FIG. 7 depicts a section of the card of FIG. 3 taken along the section lines 7—7'.

FIG. 8 depicts a section of the card of FIG. 4 taken along the section lines 8—8'.

FIG. 9 depicts an electrical schematic of the card circuitry within the card of FIG. 3.

FIG. 10 depicts an electrical schematic of an alternate switch used in the FIG. 9 circuit.

FIG. 11 depicts a representation of the digital generation of the coil drive signal.

DETAILED DESCRIPTION OF THE DRAWINGS

FIG. 1 depicts an isometric view of a card 7 positioned relative to a read head 3. The card 7 includes circuitry 23 embedded within the card which interacts with a coil 22 for supplying signals from and to the read head 3. Card 7 also includes a switch 6 which is actuated by proximity to the read head 3 when the card 7 is drawn past the read head 3 in the direction of arrow 29.

FIG. 2 depicts a schematic representation of a card 7 engaged within a magnetic stripe reader 2. The mag stripe reader 2 is a conventional device of the type utilized all over the world for reading the magnetic stripe on the back of transaction cards commonly referred to as "credit" cards. The magnetic stripe reader includes a conventional magnetic read head 3. The magnetic read head 3 connects to a read circuit 26. The read circuit 26, via the read head 3, reads in a conventional manner the data which is sorted on the magnetic stripe of the transaction card. In accordance with the present invention, the read head 3 and the read circuit 26 also function to read the signal from the card coil 22. The card coil 22 in FIG. 1 is driven by the card circuit 23. The card circuit 23 is enabled, in one embodiment described as switch 6 is actuated by contact with the read head 3 when the card 7 is translated past the head 3 during insertion of the card into the magnetic stripe reader 2. This translation of the card 7 past the head 3 frequently occurs either manually or automatically depending on the particular magnetic stripe reader 2 which is employed. Both manual and automatic magnetic stripe readers are commonly employed around the world.

As an alternative, the switch 6 need not be actuated by operation of contact with the read head 3, but can be actuated manually by the person actuating switch 6 prior to insertion into the magnetic stripe reader 2. The manual actuation of the switch 6 can occur directly by finger or other pressure actuation, can be actuated through a keyboard entry device, or by any other transducer desired.

In FIG. 3, a top view of the card 7 of FIG. 1 is shown with the internal card circuit 23, the switch 6 and the coil 22 shown as broken lines. The card circuit 23 includes the chips 30, 31, 32 and 33 interconnected with conductors.

In FIG. 4, a front view of the card 7 FIG. 3 is shown and depicting the switch 6 and the coil 22 laminated within the interior of the card 7.

In FIG. 5, a cross section of the card 7 is shown along a section line through the coil 22 of FIG. 3. In FIG. 5, the core 35 is approximately 0.7 inch in length with a thickness, G, of approximately 0.01 inch. Wrapped around the core 35 is a wire, typically number 38 AWG, which has a 0.006 inch diameter. Approximately eighty turns of the wire are wrapped around the core 35 to make the coil 22. The material for the core 35 is any high mu material and preferably one that does not disintegrate under flexing as can occur when the card 7 is bent by the user. The high mu material typically has a permeability greater than 7,000 and a 20,000 permeability has been found satisfactory. Such a material is marketed under the tradename Conectic and is available from Precision Mica.

In FIG. 5, the coil 22 including the core material 35 and the winding 34 is less than 0.030 inch and is embedded within the multi-layer structure including the layers 51, 52, 53, 54 and 55 having the thicknesses A, B, C, D, E respectively.

The layers 52 and 54 are adapted to receive metalization layers 56 and 57 which have a dimension, F, which is typically 0.001 inch. The metalization layer 57 connects to the conductor 38 of FIG. 3 and the metalization layer 56 connects to the conductor 46 of FIG. 3.

In FIG. 6, a cross section taken along the section line 6—6' of FIG. 3 is shown of the switch 6. The switch 6 has an internal cavity 58 which is filled with air, other gas or vacuum. The card 7 includes the layers 51 through 55 as described in connection with FIG. 5 with the layer 53 disrupted to form the internal cavity 58. Within the cavity 58 and on the cavity side of layer 52 are deposited first and second metal pads 58 and 59. The pads 58 and 59 are not electrically connected. The layer 54 on the cavity side 58 includes an electrically conducting layer 60 which extends on either side of the pads 58 and 59. When a force is applied in the direction of arrow 61 against the outer layer 51, the layers 51, 52 are deformed toward the direction of the broken line 62 whereby the surfaces of the pads 58 and 59 each come into contact with the conductor 60. In this way, an electrical connection is made between pad 58 and pad 59. When the force along arrow 61 is removed then the resiliency of the layers 51 and 52 returns the layers to the non-deformed position and removes contact between pads 58 and 59. The force applied at arrow 61 is typically the force of the read head 3 against a spring loaded ball 25 in the card reader 2 of FIG. 2. Of course, any force or mechanism for making a switch contact can be employed. For example, capacitive plates, finger pressure transducers and other mechanisms are all suitable for the switch mechanism 6.

In FIG. 6, the pads 58 and 59 are approximately 0.2 inch wide by approximately 0.001 thick. As indicated in FIG. 8, the pads 58 and 59 have a dimension, P, which is approximately 0.25 inch.

In FIG. 7, further details of a cavity 65 for holding a chip 66 are shown. The chip 66 is connected by solder or other electrical connection at junction 67 to the conductor 62. Similarly, the other end of the chip 66 is connected at junction 68.

In FIG. 8, a sectional view of the card 7 of FIG. 4 is shown taken along the section lines 8—8' of FIG. 4. Four cavities 65, 69, 70 and 71, by way of example, are provided for semi-conductor chips or other circuitry. The chips (not shown) are connected together by conductors. For example, conductor 62 and 63 connect the switch 6 to the cavity 65 for connection to the chip 66 of FIG. 7. Similarly, the conductors 38 and 46 connect from the coil 22, specifically the winding 34. In this way, the chip or other circuit in cavity 65 drives the winding 34 with the current, typically of the order of 22 milliamps, peak to peak. Other connectors 73 are provided for interconnecting other parts of the circuits.

Referring to FIG. 9, a 4040 counter 5 is initiated by the power supply 4 when power is turned on, for example by switch 6. The switch 6, for example, is located at the surface of the card 7 of FIG. 1. The clock 8, for example, operating at a 1 kilohertz rate, provides a clock signal on the output line 9. The clock signal can range from 10 to 2 KHz. The clock signal to the counter 5 causes the counter 5 to increment.

Prior to initiation of counting by counter 5, at power-on time, resulting from the closure of switch 6, the reset circuit 10 resets the counter 5 to an all zero condition.

The reset circuit 10 receives the B+ input from the power supply 4 on line 40. The B+ input to the reset circuit 10 is delayed a short delay period by the capacitor 11 and a resistor 37. During the short delay period, the input to the NAND gate 12 is a logical zero which forces the NAND output to a logical 1. The logical 1 from gate 12 is connected to the reset input of the counter 5. Also, the output from the NAND gate 12 connects to the enable input of the EPROM memory 13. The logical 1 on the enable input of memory 13 causes the data output on line 14 to a logical 1. The logical 1 on line 14 in turn enables the NAND gate 12 within the reset circuit 10.

After the short delay occurs by the charging of capacitor 11 NAND gate 12 receives a second logical 1 input forcing its output to a logical zero. The logical zero output from NAND gate 12 removes the reset from counter 5 and enables to the memory 13. With the reset removed from the counter 5, counter 5 commences counting the clock pulses on line 9 from the clock 8. With the enable output a logical zero to the memory 13, the forced logical 1 outputs are removed permitting the data value from memory 13 to appear on the output lines including output line 14.

The data output which appears on the output line 14 and the data output lines 19 have values corresponding to the stored data in memory 13 at the addresses represented by the input addresses from counter 5. The input addresses from counter 5 appear on the lines 16 from the counter 5. The lines 16 represent the high order bits from the counter 5 and the output lines 17 represent the low order bits from the counter 5. The low order bits on lines 17 change at a higher clock frequency in response to the clock signal on line 9 than the high order bits on lines 16. typically the signals on lines 17 have a frequency from 10 to 1000 Hz as a function of the clock signal on line 9. The low order bits 17 connect as an input to the data selector 18. The 2-bit input on lines 17 selects one of the four input lines 19 as the output on line 20. The serial output on line 20 is either a logical data one or a logical data zero depending upon the data value for the selected one of the lines 19. The logical one or zero on line 20 connects to the driver circuit 21 which drives the coil 22 to provide the output signal to the read head 3 of FIG. 1. The driver 21 is selected so as to produce a current through coil 22 of 25 or less milliamps.

The counter 5 sequences through addresses which appear on the output line 16 which in turn sequence through address locations in the memory 13. The data outputs on line 19 from memory 13 are selected one at a time by the data selector 18 to provide the data on line 20 in the desired pattern. When the full sequence of data has appeared on output line 20, the data out line 14, which has been sitting at a logical 1 during all of the sequencing, is provided as an output zero at the end of the sequence and as an input to the reset circuit 10. The logical zero into the NAND gate 12 forces the gate output to a logical 1 which in turn resets the counter 5 and enables the memory 13. The enable to the memory 13 causes the output line 14 to be again switched to a logical 1 thus enabling the reset circuit 10 again. Provided that the switch 6 in the power supply 4 has remained on, and a logical 1 appears from the capacitor 11 as an input to the NAND gate 12 the sequencing of the FIG. 9 commences all over again and continues until switch 6 is disabled.

In FIG. 9 in one implementation the counter 5 is an conventional CD4040 12-bit counter. In the embodiment described only 10 of the 12 bits are actually employed.

In FIG. 9, the EPROM memory 13 is typically a AM2716 memory which is a 16K bit memory.

In FIG. 9, the data selector 18 is typically a CD4512 device which has an 8-way selection capability of which only 4-way is employed.

In FIG. 10, an alternative switch circuit 39 for replacing the switch 6 of FIG. 9 is shown. In FIG. 10, the battery power on line 40 connects as an input to a transistor switch 42 into a double pole, single throw, momentary contact switch 43. Switch 43 has one output connected to the B+ line 41 and the other output connected as a reset to an 8-bit counter 44. The 8-bit counter 44 provides its output on line 45 to enable the switch 42 and connect the battery signal on line 40 to the B+ line 41 when enabled. The counter 44 operates to count the number of cycles of the FIG. 9 circuitry as represented by the cycle reset signal on line 14 from the EPROM 13 of FIG. 9.

The EPROM 13 is loaded with data values which are logical ones and logical zeros. In one preferred embodiment, the logical zeros and the logical ones are represented with a different number of binary bits. For example, a 0 1 binary bit combination is typically employed to represent a logical zero while a 0 0 1 1 binary bit combination is used to designate a logical one. Accordingly, when the EPROM is accessed with addresses generated with a fixed clock rate into counter 5, the logical data zeros have twice the bit frequency of the logical data ones. In this manner, the data output signal on line 20 drives the coil 22 in a manner which simulates the signal from a magnetic stripe. An example of logical data values zero, zero, one, zero, one from EPROM 13 is shown in FIG. 11 during clock times 0, 1, 2, . . . , 14. The binary values are 0 1 0 1 0 0 1 1 0 1 0 0 1 1 and form the waveform L20 representing the signal on line 20 of FIG. 9.

While in the preferred embodiment, data ones and zeros are stored in the EPROM memory 13 with different numbers of binary bits, alternative implementations can be employed. For example, the data ones and zeros can be stored in the prom 13 with the same number of binary bits while modifying the bit frequency on the output. For example, the data select 18 can be controlled as a function of the one or zero logical data value accessed from the EPROM. Particularly, the logical data zero is at a high clock frequency using one clock period per data zero and the logical data one is at the low clock frequency using two clock periods per data one to correspond to the example.

In operation, the FIG. 10 circuit is initiated whenever the momentary contact switch 43 is actuated causing the counter 44 to be reset. Upon being reset, the output on line 45 enables the gate 42 which connects the B+ signal to the line 41. The B+ signal on line 41 initiates the reset circuit 10 in FIG. 9 for commencing the operation of the FIG. 9 circuitry. Each time the FIG. 9 circuitry completes a cycle as indicated by zero to 1 transition on line 14, counter 44 is incremented. After 8 complete cycles of the FIG. 9 circuitry the counter 44 in FIG. 10 is incremented 8 times. After the eighth increment, the output from counter 44 changes state and disables the switch 42. With switch 42 disabled, the B+signal on line 41 is removed thereby disabling the entire FIG. 9. With the entire FIG. 9 disabled, no power from the battery 4 is being used. The FIG. 9 circuitry will not operate again until the momentary contact switch 43 is again actuated to restart the process all over again.

In FIG. 10, the counter 44 was selected as an 8-bit counter in order to give an adequate number of cycles of the FIG. 9 circuitry to properly actuate the magnetic head 3 of FIG. 1. Of course, if a longer signal is desired the count of counter 44 can be increased to any value so that the output signal from the coil 22 to the read head 3 will be present for as long a period as desired.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A transaction card including a magnetic stripe simulator for providing a signal to the read head of a magnetic stripe reader comprising, coil means for providing a signal to the read head, circuit means for providing a drive signal to the coil, said circuit means including means for providing a bit pattern which simulates the magnetic flux reversals provided from magnetic stripes.

2. The apparatus of claim 1 wherein said circuit means includes a digital memory for storing digital data, includes address means for addressing said memory, and includes output means for connecting the output data from said memory to said coil whereby the magnetic stripe simulation data is read from said memory for driving said coil.

3. The apparatus of claim 1 wherein said coil includes a high mu metal core and a multiturn winding wrapped around said core and wherein said core and said winding are embedded in said card.

4. The apparatus of claim 3 wherein the number of turns is approximately 80 turns of wire having approximately a 0.006 diameter.

5. The apparatus of claim 3 wherein said card is formed of a multilayer structure wherein said multilayer structure includes printed wiring for connecting said circuit to said coil windings.

6. The apparatus of claim 1 wherein said circuit means includes clock means, counter means incremented by said clock, a read only memory addressed by said counter means, a data selector means for selecting outputs from said memory means to provide said drive signal, and reset means for resetting said counter means for each cycle of said counter means.

7. The apparatus of claim 6 wherein said circuit means includes switch actuator means for actuating said circuit means whenever said switch is actuated.

8. The apparatus of claim 7 wherein said switch means includes counter means for counting the number of cycles of said circuit means and for terminating the operation of said circuit means after a predetermined number of cycles.

9. The apparatus of claim 3 wherein said coil is located approximately 0.4 inch from an edge of said card.

10. The apparatus of claim 3 wherein said circuit includes a pressure actuated switch for actuating said circuit means.

11. The apparatus of claim 10 wherein said pressure actuated switch is adapted to be actuated through pressure contact with said read head.

12. The apparatus of claim 1 wherein said card includes a multilayer structure including a first outer layer, a first inner layer having metalization for inner connecting integrated circuits and said coil, a spacer layer, a second metalization layer, said second metalization layer including means for forming a switch through said spacer layer with said first metalization layer and including a second outer layer.

13. The apparatus of claim 12 wherein said first and second outer layers have a thickness of approximately 0.004 inch whereby the gap between said coil and the read head is approximately 0.004 inch.

14. The apparatus of claim 8 wherein said counter counts through eight cycles whereby eight complete cycles of said circuit means occur after each actuation of said switch.

15. The apparatus of claim 6 wherein said clock operates at approximately within the range of from 10 to 2000 Hz.

16. A portable transaction card for providing a signal to the read head of a magnetic stripe reader comprising,
a plastic laminate including at least first and second outer layers compressed together so as to have a thickness of less than approximately 0.030 inch,
a magnetic stripe simulator encapsulated between said first and second outer layers including,
coil means for providing a signal detectable by a read head, said coil means having a magnetic core and a multiturn winding around said core,
circuit means for providing a drive signal having logical one and logical zero data values to the coil for providing a bit pattern which simulates the magnetic flux reversals provided from magnetic stripes, said circuit means including a digital memory for storing binary bits where the number of binary bits representing the zero data values are different than the number of bits representing a one data value, including address means for addressing said memory, and including output means for connecting the output binary bits from said memory to said coil.

* * * * *